RE 25230

July 11, 1961     H. W. PIERPOINT     2,991,559
GRAIN DRIER

Filed Oct. 16, 1957     2 Sheets—Sheet 1

INVENTOR
HAROLD W. PIERPOINT

A. Donald Messenheimer
ATTORNEY

July 11, 1961
H. W. PIERPOINT
2,991,559
GRAIN DRIER
Filed Oct. 16, 1957
2 Sheets-Sheet 2
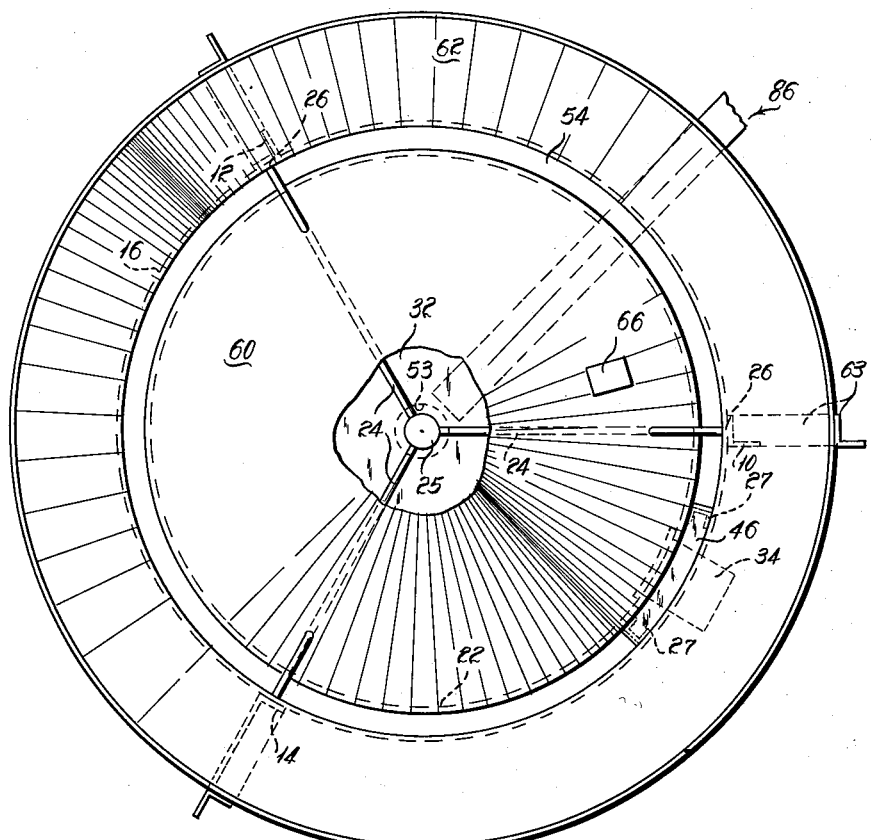
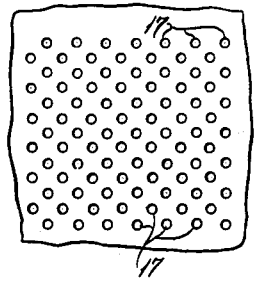
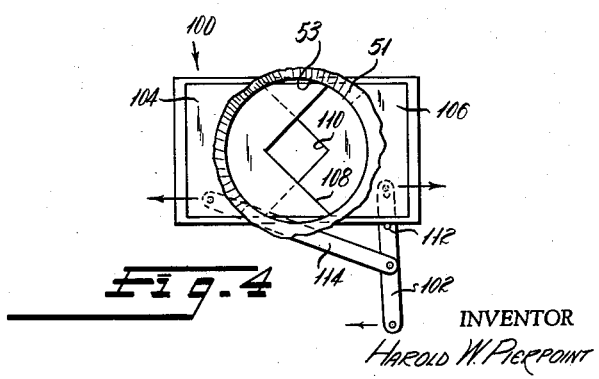
INVENTOR
HAROLD W. PIERPOINT
BY
A. Ronald Messenheimer
ATTORNEYS

2,991,559
GRAIN DRIER
Harold W. Pierpoint, Yates Center, Kans.
Filed Oct. 16, 1957, Ser. No. 690,587
6 Claims. (Cl. 34—55)

This invention relates to grain driers and more particularly to an improved grain drying apparatus effective to dry freshly harvested grain in a continuous cycle of operation.

This is a continuation-in-part of my application Serial No. 608,941 filed September 10, 1956, now abandoned.

The history of crop drying is as old as the history of agriculture. By taking moisture from grain, the growth of mold and decay bacteria is prevented. Because crops are not consumed immediately after harvest, drying has always been a popular and practical method of preservation of crops. However, in the past crops have except in isolated cases been allowed to dry while in the field, and only recently has mechanical drying come into limited general use.

The cash price for grain varies inversely in proportion to the moisture content. Most grains such as corn, wheat, oats, rice, soy beans, barley, grain sorghums, and the like can be safely stored with moisture content of from 11 to 13 percent, but when high moisture content is present, the danger of spontaneous combustion as well as spoilage and attack by insects and vermin is greatly increased. Grain buyers uniformly test grain for its moisture content and typical moisture discounts, for example with corn at a price of $1.30 per bushel, are 3 cents a bushel for each percent of moisture from 15½ to 17 percent and 4 cents a bushel for each percent of moisture over 17 percent. Thus corn at 20 percent moisture content will bring only $1.13½ cents a bushel, and at 25 percent moisture content will bring as little as $0.93½ cents a bushel. Similar moisture discounts are applied to the other grains.

Mechanical apparatus for drying crops has accordingly been adopted but has not met with general acceptance outside of large farm operations or by storage elevators principally because the apparatus for drying the crops has either been in a bin where drying procedure took several days or in large batch type driers that are too expensive for individual farmers to have. Bins have been built with special false floors which provide means for supplying air forced under the grain to pass up through the grain and out the top of the bin for drying the grain. In dry climates, only a large fan is required to effectively reduce the moisture content over a period of a few days or weeks. Oil and manufactured gas burners are commercially available for providing heat to assist in removing the moisture more rapidly and commonly used in regions where humidity conditions require heated air for effective moisture reduction. One serious disadvantage is that each bin can be used only once during the harvest period and the drying capacity is therefore effectively limited to the size of the bin. Any attempt to use the bin more than once requires the extra labor of unloading and reloading the bin.

Because of this disadvantage, box wagons have been equipped with a perforated floor a few inches above the regular tight floor. The grain is put in the box wagon directly from the harvesting machine and then the wagon is attached to a warm air duct from the drying apparatus. After the grain is dry then it must be cooled before being stored in a bin. This requires either operating the drying apparatus with the burner off, or the provision of a separate fan system to which the wagons are connected for cooling.

Each wagon holds approximately 100 bushels and it takes on the average from 2 to 5 hours to dry each wagon with grain having a moisture content ordinarily present during harvest. For example drying wheat with 20 percent moisture content takes from 3 to 4 hours; drying shelled corn at 20 percent moisture content takes from 2 to 3 hours and with 30 percent moisture content takes from 6 to 8 hours. Commercially available burners produce in the range of one million B.t.u.h. and with fan capacities of from 10,000 to 25,000 c.f.m. and two or three fans operating with one burner, two or three wagons may be simultaneously dried. The principal disadvantage is that the number of wagons needed so that harvesting operations can go smoothly and so that full capacity of the drying and cooling system is used becomes prohibitively expensive.

Large batch bin driers having capacities of from 300 to 600 bushels have been built which can dry crops approximately as fast as corn pickers and shellers can harvest. In these installations, the grain is loaded all at one time and the heated air is passed through the grain for approximately 3 hours or so depending upon the moisture content. Then the burner is turned off and the blowers operated for approximately one hour to cool the grain. An additional hour is required to load driers of this type and still further time is required for unloading thereby requiring from 5 to 6 hours per batch and the attendance, at least part time, of an operator for unloading and turning off the burner at the proper time. As a result, such large batch bin driers have generally only been installed at elevators or on the largest of farms where the initial cost and operating expenses are not prohibitive.

It is a principal object of the present invention to provide a novel crop drier which is capable of continuous operation as well as a batch type operation as discussed above, and which is particularly well suited for small farm operators to economically use. I am aware that grain driers of the general type as my invention, such for example as is disclosed in United States Patent No. 622,521 to McDaniel, have been proposed. However, such apparatus because of its construction is not adaptable for use on the farm for drying freshly harvested crops. Where commercially available burners are used, I have found having grain in the form of a wall 6 or more inches thick is desirable and to assure uniform passage of the grain through the drier which is essential to prevent over-drying and possible fire hazards, special apparatus must be provided.

Another object of the present invention is to provide an agitator to assure uniform grain movement in all positions in the drier. This is particularly advantageous as it automatically assures a uniform degree of grain drying throughout the drying chamber without having to manually level the upper surface of the grain as is required in prior bin and wagon operations, and prevents the lodging of grain in certain areas which results in under-drying part of the grain and over-drying other portions of the grain.

Still another object is to provide an inexpensive drier which has a first region supplied with heated air and a second region supplied with cooler air and means for regulating the continuous flow rate of the grain through these regions so that the only operation required is loading the grain into the drier hopper and the remaining steps are carried out automatically. In a preferred embodiment, the dried grain is removed from the drier by an auger to be placed in a storage bin or in a truck with the rate of grain removal controlled by operation of the auger which in turn controls the flow rate of grain through the drier.

A further object of this invention is to provide a vertical unobstructed flow path through the drier with a novel discharge region including an agitator to assure uniform grain flow and a port symmetrically located beneath the drier at a short distance from the supporting ground surface with grain removal apparatus controlling grain flow rate through the drier.

Another object of the invention resides in providing a novel method of operating the drier first as a "batch" type drier when the drying operation first starts and then provides continuous operation thereby eliminating re-loading the first grain run through the drier. An automatic cut-off is provided thereby permitting the farmer to return to the field to continue harvesting while the drier is in operation. The grain storage hopper is adequately large to receive a full load of grain from the harvesting equipment, and in the event the drier completes operation before the farmer returns, a switch operated by the grain level in the storage hopper opens to shut down operation of the drier.

These and other objects of the invention will become more fully apparent from the claims, and from the description as it proceeds in connection with the appended drawings wherein:

FIGURE 2 is a top plan view of the crop drier of FIGURE 1;

FIGURE 3 is a fragmentary view of the steel plate from which the drier is constructed; and FIGURE 4 is a plan view of an optional valve for the discharge port.

Figure 1:
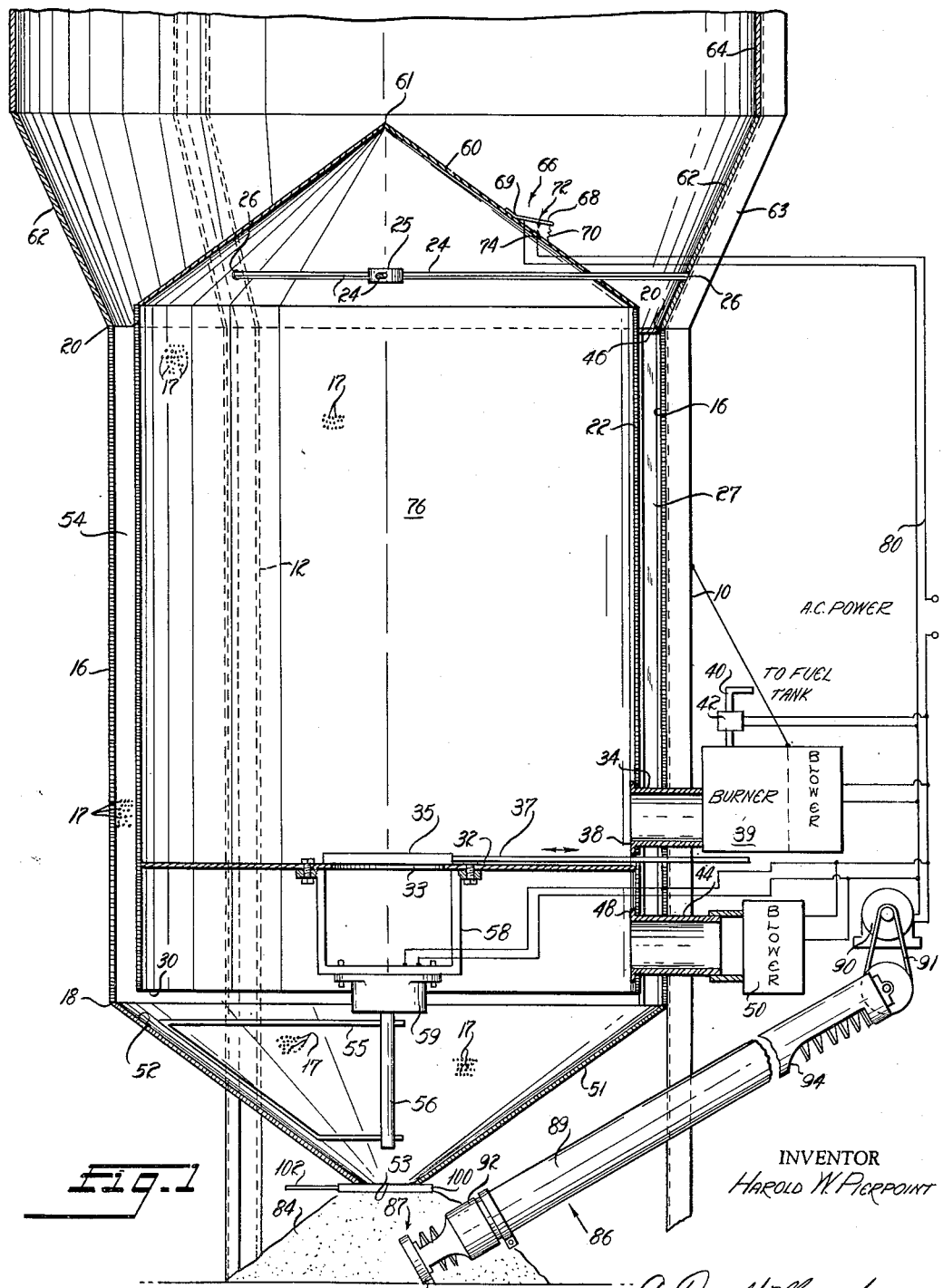
FIGURE 1 is an elevation view in section of the crop drier in accordance with one form of my invention with auxiliary equipment of conventional construction which is intended for use with the present invention shown diagrammatically.

With continued reference to the drawings, the crop drier as illustrated is supported on three legs 10, 12 and 14, which are suitably secured along the outer wall 16 as by welding or riveting. Wall 16 is made of sheet steel perforated with small holes 17 shown in detail in FIGURE 3. The holes may, for example, have a 3/32 inch diameter and be on 5/32 inch centers. Perforated steel plate of this type is commercially available in rectangular sheets of various sizes. Small areas designated 17 as shown in FIGURE 1 are representative of the holes which extend completely over the surfaces of these walls. The height of wall 16 from bottom edge 18 to top edge 20 may conveniently be in the range of 6 to 24 feet, and the diameter of outer wall 16 in the range of 6 to 12 feet. These dimensions are not critical, but are given by way of illustration as one important advantage of the drier resides in its portability so that it can be moved from one bin to another and even used inside of a large storage bin if desired. For this purpose wheels (not shown) may be provided on the bottoms of legs 10, 12 and 14.

Wall 16 is formed of three rectangular sheets of perforated sheet steel which are bent in the form of a cylinder and the adjoining edges suitably secured as by riveting or welding. Inner wall 22 is similarly constructed of identical perforated sheet steel and suitably secured to outer wall 16 as with rods 24 or angle iron braces secured together in the center by a suitable clamp 25. Rods 24 extend radially beyond inner wall 22 to be riveted or otherwise secured at or slightly above the upper ends of legs 10, 12 and 14 at 26, thus supporting inner wall 22 with lower surface 30 on inner wall 22 slightly above lower surface 18 on the outer wall 16. Two channel iron members 27 are positioned with their flanges secured to the inside of outer wall 16 and outside of inner wall 22 as shown in FIGURES 1 and 2 to further support inner wall 22 and to serve a further purpose described below.

A horizontal dividing plate 32 which may be of wood, be a frame covered with heat resistant material or be of metal, is provided in the preferred embodiment to permit operation with continuous grain flow. However, if desired, dividing plate 32 can be omitted and the usual batch type mode of operation advantageously used. In the preferred form, I provide an aperture 33 in dividing plate 32 and a door 35 arranged to sealingly close or open aperture 33 as by a hand-operated rod 37. This construction is particularly advantageous for eliminating the re-run of the first material passed through the drier when it is first started up.

Both inner wall 22 and outer wall 16 are provided with openings to receive the hot air duct 34 which preferably is a hollow metal tube secured to the interior side of inner wall 22 as by flange 38 and extends outside of outer wall 16 with a suitable coupling provided for receiving the usual canvas ducting provided by the manufacturers of blowers and heating unit combinations. Duct 34 is connected to a conventional heat unit 39 which may be an oil burner or an L.P.G. burner provided with a fan which is rated by the manufacturer as producing in the range of 500,000 B.t.u per hour or more and with the blower capacities of from 5,000 to 25,000 c.f.m. By regulating either the combustion rate of the burner or the fan speed the desired drying temperature is attained. A safe maximum temperature varies from 110° F. for seed corn to 140° F. for most other crops. Fuel is supplied to heat unit 39 by fuel line 40 including a solenoid operated valve 42.

A second set of openings is provided in inner wall 22 and outer wall 16 below division plate 32 for receiving duct 44. Duct 44 is advantageously positioned under duct 34 and between the two channel members 27. Cover 46 is provided to fit over channel members 27 to prevent grain from passing down along the region between the channel members because even though ducts 34 and 44 are provided with a curvature on the top surface so as to provide minimum interference with grain flow between inner wall 22 and outer wall 16, an objectionable degree of interference with grain flow has been found to exist. The inner wall 22 in the region between channel members 27 is made of imperforate material or otherwise provided with a suitable liner to prevent air flow through this region between channel members 27 where grain is excluded.

Duct 44 is secured to the inner surface of wall 22 as by flange 48 extending through outer wall 16 and similar flanges may be provided on the outer end to be secured to wall 16 and provide added support for inner wall 22. A suitable connection (not shown) is provided for receiving the open end of the canvased duct from blower 50, the inlet of which is open to the atmosphere.

The bottom member 51 is in the form of an inverted cone having its apex removed to provide a grain discharge port 53 symmetrically located relative to the grain passageway or annular chamber 54 between walls 16 and 22. The upper base of cone-shaped member 51 is suitably secured, as for example by welding, to bottom surface 18 of outer wall 16 so as to prevent grain leakage. The shortest distance between bottom surface 30 on inner wall 22 and upper surface 52 of bottom member 51 is preferably about the same as the radial distance between the walls 16 and 22 to assure proper grain flow along bottom member 51.

One important feature of my invention resides in making member 51 of perforated material, as for example of the same perforated material as walls 16 and 22, so that while the grain is in its course to discharge port 53 additional cooling is effected. This makes it possible to lower dividing plate 32 to within one or two feet of lower surface 30 on inner wall 22 and thus reduce the total overall height of my drier to a minimum consistent with the desired capacity of the drier. Thus, after the grain has passed from the annular chamber 54 to bottom member 51, cooling air continues to pass around the grain through the perforations of member 51 to the atmosphere. To assure uniform grain flow throughout annular channel 54, I provide an agitator bar 55 which is mounted on shaft 56 to be driven at a slow speed of a few revolutions per minute by a suitable motor and gear reduction assembly 59 which may be supported by bracket 58 secured to the underside of division plate 32. Without the agitator, I have found that the grain flow rate and hence the effectiveness of the drier is nonuniform.

On the top of inner wall 22 there is provided a conical surface 60 of solid sheet steel which serves as the bottom of the hopper. The bottom of surface 60 and the top of inner wall 22 are suitably secured to prevent grain leakage into plenum 76. I prefer not to have bottom 60 of the hopper perforated because as the grain level in the hopper drops below apex 61, the heated air would escape through the hopper without drying the grain in the annular chamber. The outer wall 62 of the hopper is shown tapered outwardly and supported by extensions 63 on legs 10, 12 and 14. The upper hopper wall 64 extends upwardly to provide a hopper capacity adequate for receiving the entire load of grain from a harvester and to supply grain to the annular drying region 54 between walls 16 and 22 for several hours so that the equipment may run unattended.

On bottom surface 60 of the hopper, I provide a pressure actuated switch 66 having a plate 68 which is forced upwardly about hinge 69 forming a pivot axis, into its illustrated position by spring 70 holding contacts 72 and 74 open. Switch 66 is located at approximately 6 inches or 1 foot above upper surface 20 of outer wall 16 to be closed by the weight of grain in the hopper and to open when the grain falls below this level. If the upper level of the grain should drop below top surface 20 on outer wall 16, the bulk of the heated air from heat unit 38 would escape to the atmosphere and be ineffective to dry the grain remaining in annular chamber 55 between the walls 22 and 16.

Switch 66 is accordingly wired in series with electrical conductor 80, solenoid valve 42 in the fuel line, heat unit 39 and blower 50 and is effective to shut down operation of the drier when the grain in the hopper falls below a predetermined level.

When grain is present in the hopper, the space between walls 16 and 22 serves to provide a solid wall of grain of the uniform thickness around the plenum on the interior of inner wall 22, except for the space closed off between channel members 27. It is not essential that circular walls are used as any closed polygon will have good vertical rigidity and provide an annular drying chamber surrounding plenum 76. Hot gas or air supplied through duct 34 can only escape through the perforations of inner wall 22, pass around the grain between the inner and outer walls and through the perforations in outer wall 16. Below dividing plate 32, cooler gas or air is supplied by blower 50 to escape to the atmosphere through a similar path in its upper region thus cooling the grain. Since the size of port 53 is relatively small, the grain moves slowly along bottom member 51 and hence is continuously subjected to the cooling air from duct 46, some of which passes through the perforations in bottom member 51.

Since the grain removal region at port 53 faces and, in a preferred embodiment, is only some 9 to 18 inches above the ground, grain will not flow through port 53 to provide a pile higher than the height of the port above the ground. Hence total grain flow onto the ground is limited to a small pile as illustrated at 84. In accordance with another feature of my invention I provide a conventional auger 86 or similar grain conveyor having a grain receiving section 87 positioned under port 53. Augers of this type are well-known and a suitable example is disclosed in United States Patent No. 2,425,681 to Lewis et al.

Such augers conventionally include a helical blade 88 rotatably mounted on a longitudinal axis in a tubular housing 89 for loading grain into a bin or on a truck. The speed of helical blade 88 accordingly controls the rate of passage of grain through the auger. However, the rate of grain flow through auger 86 may also be controlled by a sleeve 92 which is slidable along auger housing 89 to partially cover the grain receiving end 87 and thereby reduce the amount of grain picked up by the rotating blades for each revolution. The rate of grain removal by auger 86 from the pile beneath port 53 controls the rate passage of grain through port 53 and hence controls the amount of time the grain is in the effective drying regions of the drier. While the speed of auger blade 88 may be varied to adjust the grain removal rate, I prefer to use electric motor 90 to drive auger 86 by belt 91 at a single speed and to position sleeve 92 along housing 89 for adjusting the rate of grain flow through the drier. This method of control is quite effective and does not require expensive variable speed drives or auxiliary equipment on the drier. At the same time the grain discharge end 94 of auger 86 is positioned to load the dried grain in a truck or bin as desired thus providing equipment which requires a minimum handling of the grain and which can be operated by a farmer without additional help while using other harvesting equipment.

On the lower side of port 53, a discharge gate 100, shown also in FIGURE 4, is preferably provided. Where gate 100 is used to regulate grain flow rate, as for example when the dried grain is to be stored in a pit, the grain discharge port should open symmetrically about the center of the inverted conical bottom member 51. A satisfactory gate, as illustrated in FIGURE 4, may be composed of two sliding plates 104, 106 having V-shaped edges 108, 110 respectively. A link arrangement including handle 102, which is pivoted on the frame about an axis at 112, is pivotally connected at one end to plate 106 and through rigid link 114 to plate 104. When the free end of handle 102 moves clockwise as shown in FIGURE 4, plates 104 and 106 move apart. Discharge gate 100 may accordingly serve as a removable closure member and as a grain flow rate control member where desired.

In operation the drier is usually placed adjacent a truck or bin with the grain receiving end 87 of auger 86 under port 54 and the other end of the auger discharging grain into the bin or truck. A load of freshly harvested grain is placed in the hopper and the equipment turned on. Valve 42 is opened, heat unit 39 turned on and door 35 in division plate 32 opened. This supplies warm drying air to all the grain in the drier. After a few minutes door 35 is closed and blower 50 turned on to cool the grain in the lower region below divider plate 32. Operation of heat unit 39 is preferably shut down or continued at a slower rate until discharge gate 100 is opened or removed as the case may be and auger motor 90 turned on after the grain in the lower region of the drier has been cooled.

In prior driers which did not have door 35, the first few bushels of grain had to be returned to the hopper since they passed through the drying apparatus without being in the annular drying chamber 54 for the necessary time to have the moisture content reduced. With the drier here described, no return is necessary and after adjusting sleeve 92 to control the grain removal rate of the auger, the farmer is free to return to the field and harvest another load of grain. Subsequent loads of grain are then hauled to the drier, placed in the hopper and operation of the drier is continuous and without attendance. If the farmer does not return to the drier by the time the grain in the hopper drops below switch 66, the drier automatically shuts down and auger motor 90 is turned off. There is accordingly no waste of fuel or electricity, and no danger of damage to any equipment. Moreover, in my system the grain is removed from the drier continuously at the same rate it is dried thus eliminating the one hour or more time necessary for unloading and loading the drier after each operation as in prior batch types.

If it is desired to store the dried grain in a pit, auger 86 may be dispensed with and control of the grain flow rate regulated by discharge gate 100.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for drying grain comprising outer and inner sheets of perforated material shaped to form a substantially closed wall of grain of uniform thickness surrounding an inner plenum; a divider plate supported by said inner sheet for separating said plenum into upper and lower chambers; means positioned above said sheets for feeding grain into the space between said sheets; a source of heated gas; first duct means extending through said sheets for directing heated gas into the upper chamber of said plenum; second duct means extending through said sheets beneath said first duct for directing a cooler gas into the lower chamber of said plenum; grain barrier means between said inner and outer sheets on opposite sides of and supported by said first and second duct means for preventing grain flow in contact with said duct means; an inverted conical bottom member of perforated material connected to the outer sheet and having a centrally located grain removal region; said bottom member being positioned beneath the lower edge of said inner sheet; and agitator means supported in said inner plenum having a stirring member mounted for movement in a path adjacent the surface of said bottom member to stir grain on said bottom member to assure even grain feed rate all around said drying apparatus.

2. In a grain drier: a plenum; an annular drying chamber surrounding said plenum and defined by vertically disposed space separated inner and outer walls of a perforated material for permitting vertical grain flow through said space; a horizontal division plate extending across the interior of said plenum and having a peripheral edge adjacent said inner wall; conduit means extending through said walls for supplying air heated to a temperature of from 110° F. to 140° F. to said plenum above said division plate and for supplying ambient air below said division plate; an inverted conical bottom member of perforated material for receiving grain from said annular drying chamber, the upper surface of said bottom member facing the lower surface of said division plate, said bottom member being contiguous to and dependent from the outer perforated wall and having a grain removal region at the apex of said conical bottom member; and agitator means including a shaft mounted for rotational movement having a stirring member positioned adjacent the upper surface of said bottom member and mounted to turn with said shaft for passing through the grain on said bottom member to assure even grain flow through said annular drying chamber, an electric motor for driving said shaft, and means supported by said inner wall for mounting the motor in the part of said plenum beneath said division plate supplied with the cooler air.

3. The grain drier as defined in claim 2 wherein said conduit means comprises two separate air ducts which are spaced one beneath the other and further containing grain barrier means between said inner and outer walls on opposite sides of said ducts for preventing grain flow in contact with said ducts.

4. The grain drier as defined in claim 2 further comprising a pair of imperforate channel members secured to said inner and outer walls and positioned adjacent opposite sides of said conduit means and extending upwardly to the top of said drying chamber to rigidly support the inner wall relative to the outer wall, cover means extending across the tops of said channel members and over the space therebetween to prevent grain flow between said channel members and contact of the grain with said heated air duct, the inner wall being imperforate in the region above said conduits and between said pair of channel members to prevent air flow through that portion of the annular drying chamber in which grain is excluded.

5. The grain drier as defined in claim 2 further having gate means at said grain removal region for regulating grain flow through the drier which opens symmetrically about the center of said region at adjustable positions for differing grain flow rates.

6. The grain drier as defined in claim 2 wherein said motor mounting means comprises bracket means secured to said division plate.

References Cited in the file of this patent

UNITED STATES PATENTS

| | | |
|---|---|---|
| 622,521 | McDaniel | Apr. 4, 1899 |
| 865,546 | Uhlhorn | Sept. 10, 1907 |
| 1,196,979 | Randolph | Sept. 5, 1916 |
| 1,266,013 | Gray | May 14, 1918 |
| 1,341,676 | Robert | June 1, 1920 |
| 1,863,803 | Pantenberg | June 21, 1932 |
| 1,897,394 | McNeil | Feb. 14, 1933 |
| 2,055,725 | Johnson | Sept. 29, 1936 |
| 2,119,615 | Wendeborn | June 7, 1938 |
| 2,520,871 | Wright | Aug. 29, 1950 |
| 2,740,204 | Seltzer et al. | Apr. 3, 1956 |
| 2,772,487 | Arndt | Dec. 4, 1956 |

FOREIGN PATENTS

| | | |
|---|---|---|
| 278,263 | Great Britain | Oct. 6, 1927 |